(12) United States Patent
Magers

(10) Patent No.: US 6,640,797 B1
(45) Date of Patent: Nov. 4, 2003

(54) GRILL ASSEMBLY

(76) Inventor: Charles F. Magers, 5548 Donatello Dr., Fort Wayne, IN (US) 46818

( * ) Notice: Subject to any disclaimer, the term of this patent is extended or adjusted under 35 U.S.C. 154(b) by 0 days.

(21) Appl. No.: 10/087,375

(22) Filed: Mar. 1, 2002

(51) Int. Cl.[7] .................................................. F24B 3/00
(52) U.S. Cl. ...................................................... 126/30
(58) Field of Search ....................... 126/30, 29; 99/449; 248/125

(56) References Cited

U.S. PATENT DOCUMENTS

| | | | | |
|---|---|---|---|---|
| 4,607,608 A | * | 8/1986 | Allred et al. .................. | 126/30 |
| 4,896,651 A | * | 1/1990 | Kott, Jr. ........................ | 126/30 |
| 5,307,797 A | * | 5/1994 | Kleefold ....................... | 126/30 |
| 5,355,867 A | * | 10/1994 | Hall et al. ..................... | 126/30 |
| 5,819,718 A | * | 10/1998 | Leiser .......................... | 126/30 |
| 5,862,742 A | * | 1/1999 | Bjerg ........................... | 99/449 |

* cited by examiner

*Primary Examiner*—Henry Bennett
*Assistant Examiner*—Sabrina Dagostino

(74) *Attorney, Agent, or Firm*—Krieg DeVault Lundy LLP

(57) ABSTRACT

A new and improved grill assembly for cooking over an open fire at a campsite comprising a stake from which a grill is cantilevered outwardly and suspended over an open fire. The stake is driven into the ground or guide wire supported as desired. The grill is rotatable about the stake and adjustable along the vertical length of the stake and securable at any height above the fire by a frictional engagement with the stake. The frictional engagement comprises a binding ring disposed about the stake that binds to the stake as a result of the center of gravity being radially outward from the stake. The grill also comprises accessory pieces such as a hook for hanging a cooking pot, a secondary grill platform for more grilling space, for warming, or for support for a cutting board, and a rotisserie attachment for slow roasting food. The accessories are each secured to the stake above the grill or below the grill, as desired, by frictional engagement with the stake. This frictional engagement is by a helical ring that can be attached or removed laterally or angularly instead of coaxially or longitudinally of the stake. The grill and each of the accessories each are of steel or iron construction, and corrosion and other wear scours and actually enhances the binding action of the frictional engagement means for the grill and each of the accessories.

30 Claims, 3 Drawing Sheets

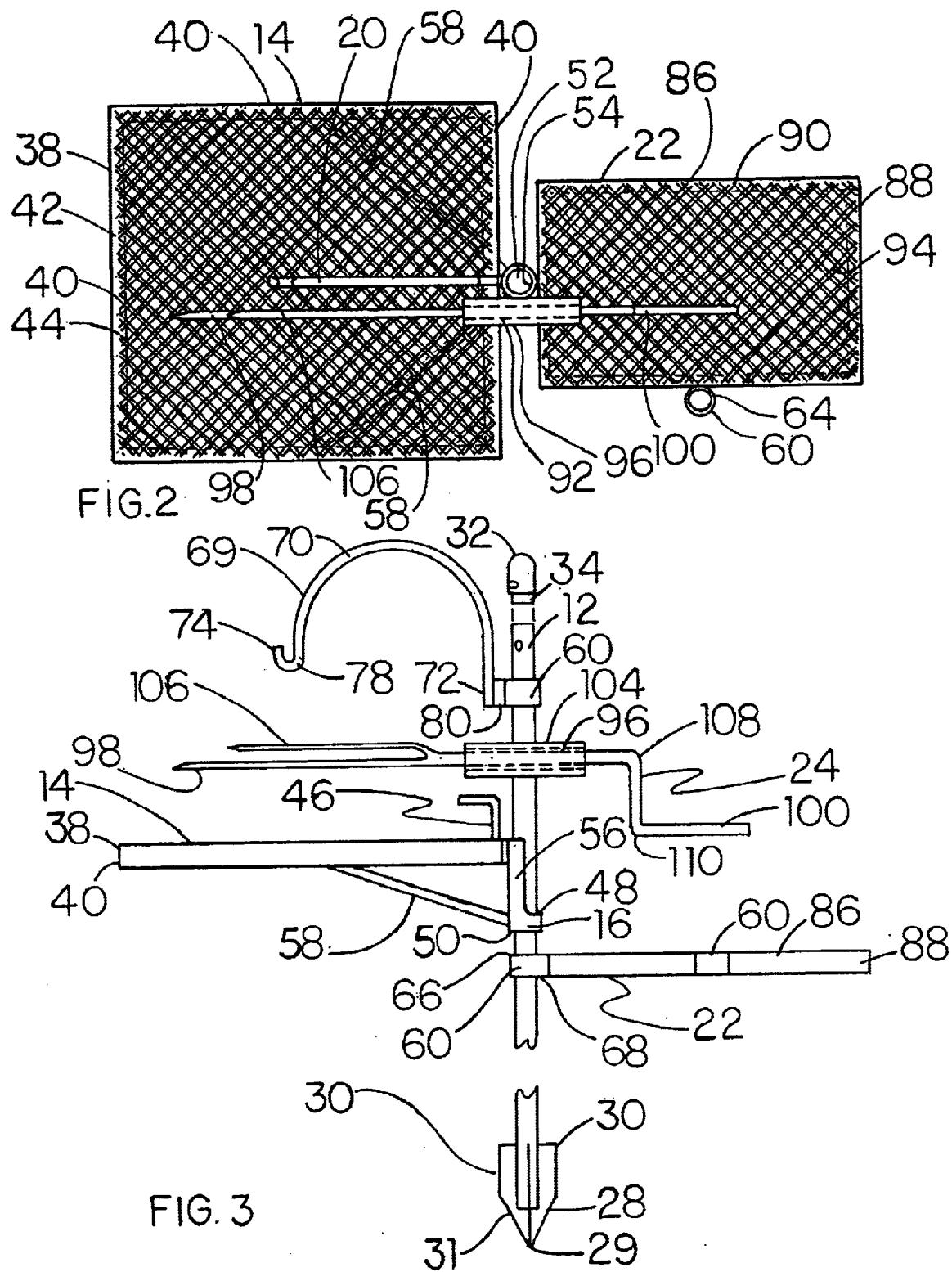

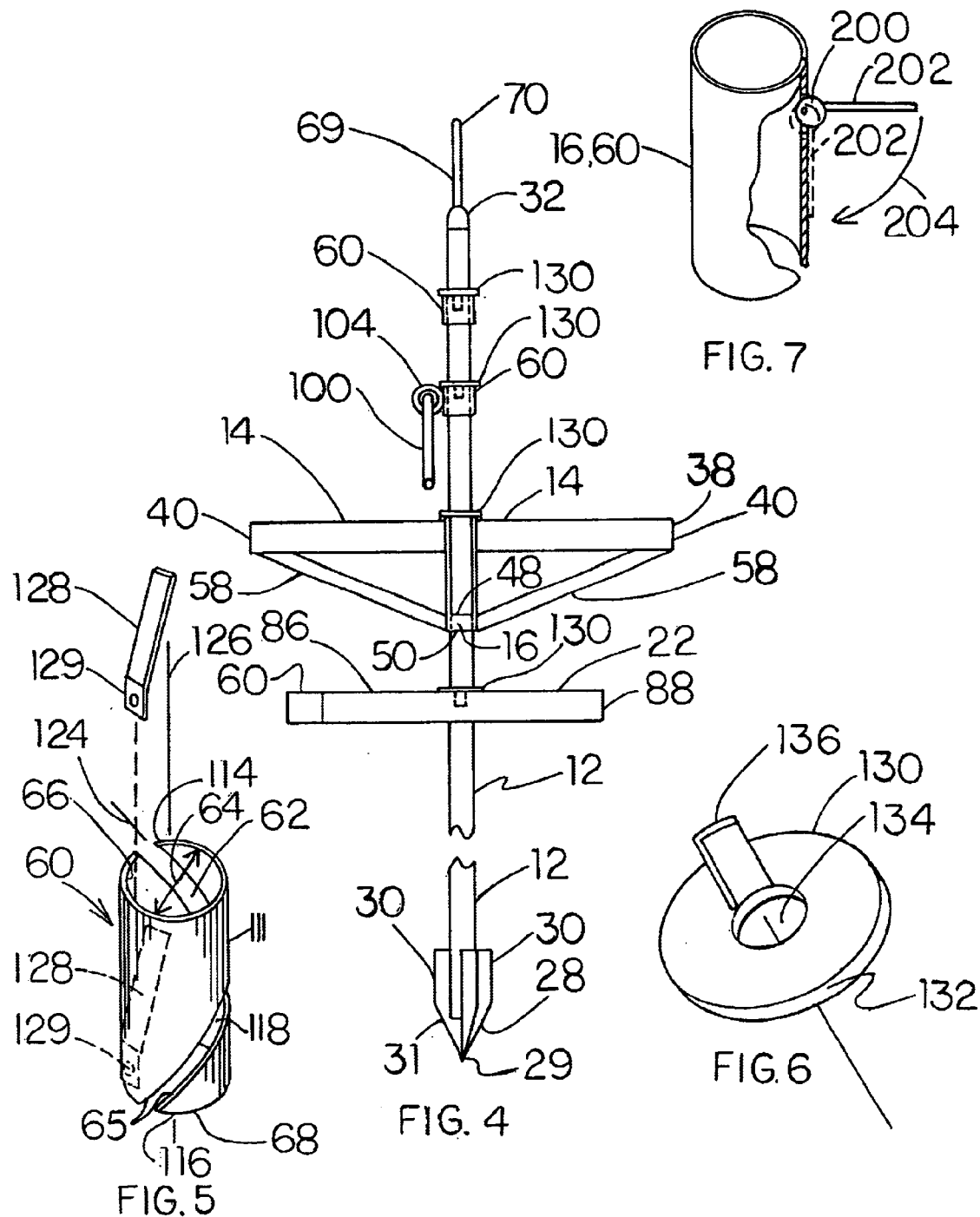

GRILL ASSEMBLY

BACKGROUND OF THE INVENTION

The present invention relates to a grill, and more specifically to a portable grill assembly for use for open fire cooking at a campsite.

Outdoorsmen have been cooking over open fires for centuries. Usually, the utensils used are conventional cooking utensils supported on makeshift supports or hung from cantilevered twigs erected at the site. More recently, states have provided stationary grills at state operated campsites. However, these grills are basic, inexpensive and are more suitable for gas or charcoal grills than open campsite cooking fires. It is therefore highly desirable to provide a new and improved grill assembly. It is also highly desirable to provide a new and improved grill assembly for open fire cooking at campsites.

Many of these grills contain the fire within a ring of steel. Supported on top of the ring is a grill but there is no means for adjusting the height of the grill from the fire. It is also highly desirable to provide a new and improved grill assembly for open fire cooking at campsites which is adjustable in height from the fire.

Moreover, these grills are subject to weather elements and so have limited life due to corrosion in addition to wear and tear from regular use. Grills that can be adjusted above a fire are not designed to withstand weathering. For the most part, these grills are made of steel and the grills are susceptible to accumulating a lot of cooking grease. Such accumulation and rust due to the weather often prevents the adjustability of grill height. It is also highly desirable to provide a new and improved grill assembly for open fire cooking at campsites which can withstand weather from the elements and is not disabled by corrosion.

Most all of these grills do not have accessories of either modem day charcoal grills or gas grills and thus are not provided with rotisseries, warming surfaces and the like. It is also highly desirable to provide a new and improved grill assembly for use over an open fire at a campsite which has all of the amenities and accessories of gas grills and charcoal grills.

Other grill assemblies have been provided for cooking over an open fire, but they require clamps, brackets, coupling means, or set-screws for mounting the grill to a central rod that is inserted in the ground or set up and supported on the ground adjacent to an open fire. Such mounting mechanisms are susceptible to wear and tear, and are often rendered unusable when rust from corrosion inevitably sets in.

It is therefore highly desirable to provide a new and improved grill assembly utilizing a new and improved binding ring by which all accessories may be supported above an open campfire without the use of clamps, brackets, coupling means, set screws and the like and without concern for wear and tear and corrosion.

It is also highly desirable to provide a new and improved grill assembly for use over an open fire at a campsite that does not require various mechanisms for assembly and mounting of the grill.

There have also been difficulties in utilizing gas grills at campsites because of the difference in the terrain of the campsite. Some campsites have relatively sandy soil, others have wooded soil and still others have rock foundation. It is therefore highly desirable to provide a new and improved grill assembly for use in cooking over an open fire at a campsite irrespective of what type of soil surrounds the campsite.

Finally, grills for cooking over an open fire have always been difficult to render them portable. The major reason being is that they are made of steel, are relatively heavy, large, cumbersome and bulky. It is therefore highly desirable to provide a new and improved grill assembly for use in cooking over an open fire at a campsite which is relatively portable and which can be transported by campers from campsite to campsite.

Finally, it is highly desirable to provide a new and improved grill assembly for cooking over an open fire at a campsite which includes has all of the above-identified features.

SUMMARY OF THE INVENTION

It is therefore an object of the invention to provide a new and improved grill assembly.

It is also an object of the invention to provide a new and improved grill assembly for open fire cooking at campsites.

It is also an object of the invention to provide a new and improved grill assembly for open fire cooking at campsites which is rotatable 360° over and away from the fire and adjustable in height from the fire.

It is also an object of the invention to provide a new and improved grill assembly for open fire cooking at campsites which can withstand weather from the elements and is not disabled by corrosion.

It is also an object of the invention to provide a new and improved grill assembly for use over an open fire at a campsite which has all of the amenities and accessories of gas grills and charcoal grills.

It is also an object of the invention to provide a new and improved grill assembly utilizing a new and improved binding ring by which all accessories may be supported above an open campfire without the use of clamps, brackets, coupling means, set screws and the like and without concern for wear and tear and corrosion.

It is also an object of the invention to provide a new and improved grill assembly for use over an open fire at a campsite that does not require various mechanisms for assembly and mounting of the grill.

It is also an object of the invention to provide a new and improved grill assembly for use in cooking over an open fire at a campsite irrespective of what type of soil surrounds the campsite.

It is also an object of the invention to provide a new and improved grill assembly for use in cooking over an open fire at a campsite which is relatively portable and which can be transported by campers from campsite to campsite.

It is finally an object of the invention to provide a new and improved grill assembly for cooking over an open fire at a campsite which includes has all of the above-identified features.

In the broader aspects of the invention there is provided a new and improved grill assembly for cooking over an open fire at a campsite comprising a stake from which a grill is cantilevered outwardly and suspended over an open fire. The stake is driven into the ground or guide wire supported as desired. The grill is rotatable about the stake and/or adjustable along the vertical length of the stake and securable at any height above the fire by a frictional engagement with the stake. The frictional engagement comprises a binding ring disposed about the stake that binds to the stake as a result of the center of gravity being radially outward from the stake. The grill also comprises accessory pieces such as a hook for hanging a cooking pot, a secondary grill platform for more grilling space, for warming, or for support for a cutting board, and a rotisserie attachment for slow roasting food. The accessories are each secured to the stake above the grill or below the grill, as desired, by frictional engagement with the stake. This frictional engagement is by a helical ring that can be attached or removed laterally or angularly instead of coaxially or longitudinally of the stake. The grill and each of the accessories each are of steel or iron construction, and corrosion and other wear scours and actually enhances the binding action of the frictional engagement means for the grill and each of the accessories.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 2 is a top view of the grill assembly shown in FIG. 1 with the wedges removed for clarity;

FIG. 3 is a fragmentary side view of the grill assembly shown in FIG. 1 with the wedges removed for clarity;

FIG. 4 is a rear view of the grill assembly shown in FIG. 1;

FIG. 5 is an exploded perspective view of the helical ring of the invention showing the spring exploded therefrom;

FIG. 6 is a perspective view of the wedge utilized with each of the accessories of the invention; and FIG. 7 is a perspective view of another wedge that may be utilized with each of the accessories of the invention.

DETAILED DESCRIPTION OF SPECIFIC EMBODIMENTS

Figure 1:
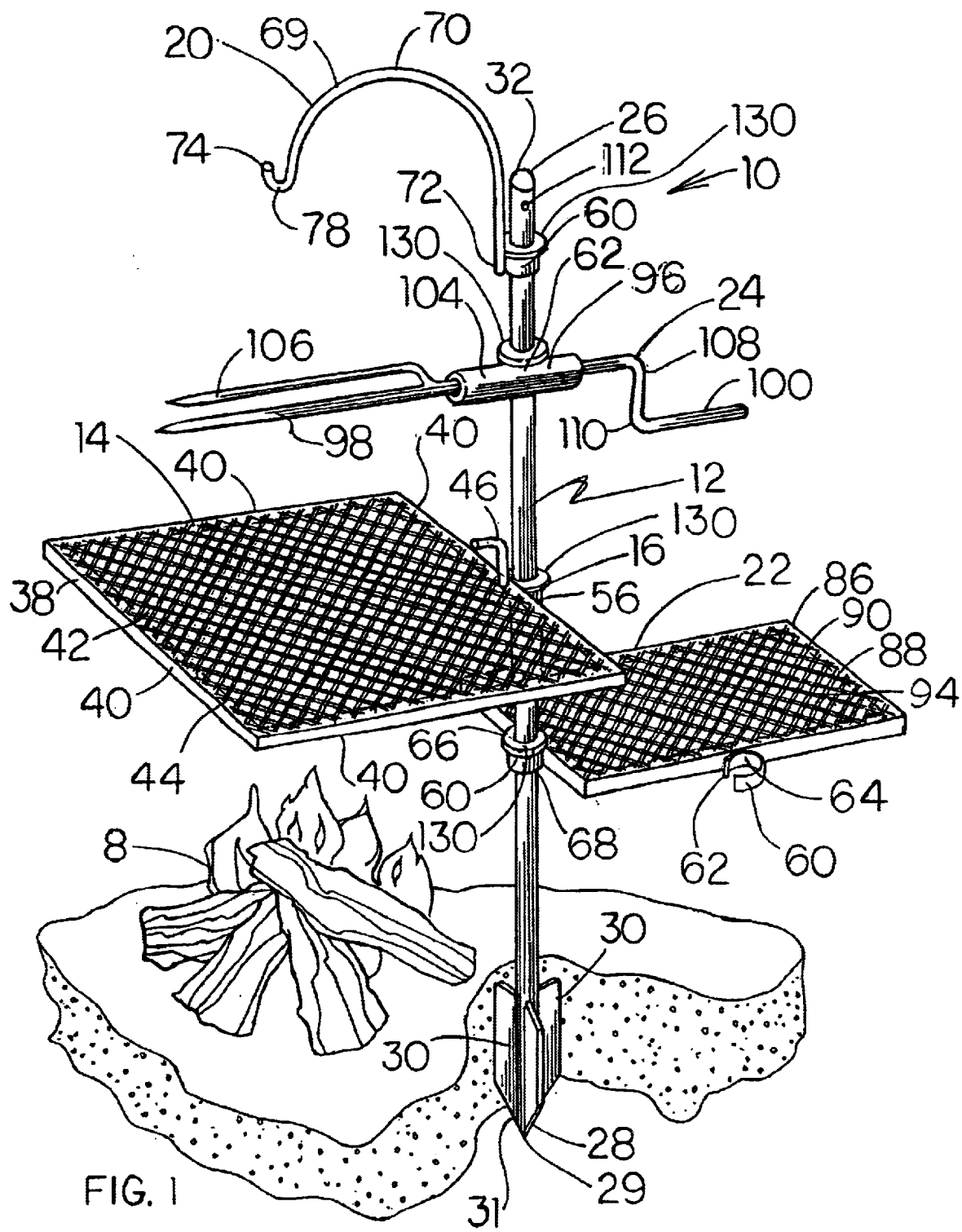
FIG. 1 is perspective view showing the new and improved grill assembly of the invention including the stake, the grill, the hook, the rotisserie, and the secondary grill all assembled on the stake.

Referring now to FIGS. 1–4, a new and improved outdoor grill assembly 10 is provided for cooking over an open fire 8. The grill assembly 10 comprises a stake 12 and a grill 14 that is cantilevered outwardly from the stake 12. The stake 12 is inserted into the ground adjacent to an open fire 8, such as at a campsite. The grill 12 is cantilevered from the stake 12 from a frictional engagement that comprises a binding ring 16 that binds to the stake 12 without extraneous mechanisms or moving parts other than the binding ring 16 itself. The binding ring 16 uses the center of gravity 18 of the grill 12 which is located radially outward from the stake to cause the binding ring to bind to the stake 12, which is coaxially disposed within the ring 16. The grill assembly 10 may also have one or more accessories cantilevered from the stake 12, such as a hook 20 for suspending a cooking pot having a handle bar, a second grill 22 for adding grilling space or for a warmer, or a rotisserie 24 for slow-roasting food instead of grilling.

In a specific embodiment, the stake 12 is of rigid construction in order to be able to withstand insertion into the ground such as by driving with a hammer, and in order to support itself substantially upright after being inserted into the ground. Moreover, the stake 12 must be able to support the grill 14 and any number of accessories mounted to it. The stake has a top 26 and a bottom 28, the bottom 28, in a specific embodiment, being tapered inwardly to a point 29 to facilitate inserting the stake 12 into the ground.

In a specific embodiment, the stake has a plurality of outwardly extending vertical support fins 30 secured to the stake 12 at or near the bottom 28 of the stake 12. The fins 30 provide greater stability for the stake when inserted into soft ground such as sand, tilled soil, or rocky terrain. In other specific embodiments, the fins 34 extend radially outwardly and are tapered inwardly at the bottom 31 towards the bottom 28 of the stake 12 to facilitate inserting the stake 12 with fins 30 into the ground. In yet other specific embodiments, the fins 30 extend radially outwardly from the stake approximately 5 inches, are approximately 6 inches in height and taper inwardly towards the bottom 28 of the stake 12 at an angle of approximately 40 degrees. For greater stability of the stake 12 when inserted into the ground, the fins 30 are equally spaced along the periphery of the stake. In a specific embodiment, there are 3 fins extending radially outward from the stake at approximately 120 degree from each other.

In a specific embodiment, the top of the stake 12 has a configuration consistent with the main body of the stake 12 and permits the binding ring 16 of the grill 14 to slide freely over the top 26 to the main body of the stake 12 when the binding ring 16 is disposed coaxially with the stake 12. In other specific embodiments, the top 26 of the stake 12 is an open tube or pipe. In yet other specific embodiments, when the top 26 of the stake 12 is open, the top is closed by a cap 32 having a stem 34 coaxially disposed in the open top end 32 of the stake and a shoulder flange connected to the cap stem for retaining the cap at the top of the stake 12. In a specific embodiment, cap 32 may be of a hardened material to provide an anvil surface such that the stake may be pounded into the ground repeatedly without misshaping stake 12. In a specific embodiment, stake 12 may be provided with a hole 112 extending through stake 12 adjacent end 26 large enough to allow guy wires to be attached to hold stake 12 vertical when necessary.

The grill 14 has a peripheral frame 38 and a grate 42 disposed within the frame. The peripheral frame 38 can have any geometric configuration suitable for grilling purposes. In a specific embodiment, the grill frame 38 has a rectangular or square configuration. In other specific embodiments, the frame 38 is constructed of a plurality of interconnected frame members 40. In yet other specific embodiments, the frame 38 is comprised of four straight frame members 40 of approximately equal length, each connected to another frame member 40 at the opposite ends, the connection between frame members 40 being approximately perpendicular. In yet other specific embodiments, each frame member 40 is a 1 inch by 1 inch angle iron. The binding ring 16 is secured to the outside surface of the grill frame 38.

The grill grate 42 can have any configuration suitable for grilling food. In a specific embodiment, the grate 42 configuration is a series of perpendicular cross hatches 44. In other specific embodiments, the configuration of the grill grate 42 is a plurality of diagonal cross hatches 44. The grill grate 42 is dimensioned at its periphery according to the peripheral configuration of the grill frame 38. In the embodiment in which the grill frame 38 is angle iron, the grate 42 is secured to the bottom side of the horizontal flange of the frame 38.

In order to lift the grill 14 for mounting on the stake 12, and in order to maneuver the grill 12 to a desired height or radial position about the stake 12, in a specific embodiment, the grill has a handle 46. Handle 46 is secured to the grill frame 38. In other specific embodiments, the handle 46 is secured to the grill frame 38 at or near the location of the frame 38 to which the binding ring 16 is secured. In yet other specific embodiments, the handle 46 extends upwardly from the grill frame 38 and bends laterally in a direction desirable for safe handling of the grill 12 over an open fire. The handle 46 should be of rigid construction sufficient to support the weight of the grill 12 when a person picks up the grill by the handle 46. In a specific embodiment, the handle 46 is an iron or steel bar configured as described above. In other specific embodiments, the handle 46 is constructed of an iron or steel bar between 0.25 inches and 0.75 inches in thickness or diameter.

The binding ring 16 binds to the stake 12 to mount the grill in a particular position or height above an open fire. The binding action of the binding ring 16 is caused by the center of gravity of the grill being laterally outward from the ring, causing an angular displacement of the ring 16 about the stake 12. The angular displacement causes frictional engagement between the binding ring 16 and the stake 12 at the upper edge 48 of the ring 16 on the side of the stake opposite the extension of the grill, and at the lower edge 50 of the ring 16 on the same side of the stake as the grill extension.

The binding ring 16 itself is a ring having a configuration geometrically similar to that of the stake 12. The binding ring 16 has a slightly larger peripheral dimension in order that the stake 12 may be inserted within the ring 16. The binding ring 16 has an axial length to diameter ratio of about 1.1 or less, and a diameter not so much larger and a length not so much longer to preclude the binding action of the ring 16 when the grill 14 is left unsupported except by the binding ring 16. In a specific embodiment, the stake 12 has a generally cylindrical configuration and the binding ring 16 is of generally tubular, cylindrical configuration, having an inner diameter 52 that is only slightly larger than the outer diameter 54 of the stake 12. In other specific embodiments, the inner diameter 52 of the binding ring is approximately 1.4 inches and the outer diameter 54 of the stake 12 is 1.3 inches and the axial length of the ring 16 is 1.4 inches or less. In yet other specific embodiments, the outer diameter 54 of the stake 12 is at least 0.05 inches less than the inner diameter 52 of the binding ring 16, and no more than 0.2 inches less than the inner diameter of the binding ring. In other specific embodiments, the stake 12 and binding ring 16 may have non circular cross-sections and be made of square, triangular, hexagonal or other tubing as desired. In these embodiment, the flat sides of the stake 12 and binding ring 16 allow for the grill 14 to be fixed in rotary position about the axis of stake 12 or fixed in rotary position and yet rotatable about the axis of stake 12.

In order to increase the binding activity of the binding ring 16, in a specific embodiment, the binding ring 16 and the grill 14 are secured to one another by a vertical offset piece 56. The offset piece 56 is connected at one end to the binding ring 16 and extends upward from the binding ring 16 along the longitudinal length of the stake 12. The upper end 57 of the offset piece 56 is secured to the grill 14, causing the grill 14 and the binding ring 16 to have a vertically spaced apart relation such that the grill 14 extends from the stake 12 at a height above the location of the binding ring 16 when frictionally engaged with the stake. By securing the binding ring 16 and the grill 14 to each other in a spaced apart relation, the center of gravity of the grill 14 is raised, thereby enhancing the binding action of the binding ring 16 by increasing the angular downward force causing the angular displacement of the binding ring 16 about the stake 12 and thereby increasing the amount of frictional force used to stabilize the binding ring 16 at a particular location along the length of the stake 12. In a specific embodiment, the offset piece 56 raises the grill 12 in relation to the binding ring 16 between 1 inch and 10 inches. In other specific embodiments, the offset piece 56 is a contiguous extension from the binding ring 16 such that the binding ring 16 and the offset piece 56 comprise a single member. Using an offset piece 56 also provides for the use of struts 58 between grill 14 and the binding ring 16. Struts 58 appreciably strengthen the securance of offset piece 56 to grill frame 38.

The binding ring 16 is generally coaxially disposed about stake 12 whenever the grill 14 is adjustable longitudinally of stake 12. The binding ring 16 is frictionally secured by rotating binding ring 16 out of its coaxial position about axes transverse to the longitudinal axis of the stake 12 into an angular position in which opposite top and bottom edges of the binding ring 16 frictionally engage the stake 12 to secure the grill 14 to the stake 12. In a specific embodiment, to ensure that the binding ring 16 is always engaged to stake 12 in an at rest position and cannot be unintentionally dislodged therefrom, a spring 128 may be positioned within ring 16 to urge ring 16 into its angular position and to rotate binding ring 16 out of its coaxial position. See FIG. 5. In a specific embodiment, spring 128 is a leaf spring, spot welded adjacent the bottom of ring 16 or 60, extending longitudinally of ring 16, 60 upwardly. The weight of the grill 14 and the force of the spring 128 is sufficient to prevent any unintentional movement between the grill 14 and the stake 12 in this non-coaxial position in all occasions. Even though frictionally secured to the stake 12 in this non-coaxial position, grill 14 may be rotated about the stake 12 having circular cross-sections for positioning the grill alternatively over an open fire or away from the open fire.

In a specific embodiment, both the stake 12 and the binding ring 16 have circular cross-sections taken transversely of the longitudinal axes of both the binding ring 16 and the stake 12. In this circular cross-section embodiment, the grill 14, when attached to stake 12, may be freely rotated about stake 12 and positioned at any radial position with regard to the stake 12. In other embodiments, both stake 12 and binding ring 16 have polygonal cross-sections such as square, hexagonal or the like, having a plurality of flat faces. In such embodiments, the grill 14 may still be rotated about stake 12 as above described with the embodiment having circular cross-sections when coaxial, but when frictionally secured to stake 12, will be also radially secured to the stake 12 and positioned with a flat face of the binding ring 16 coincident with the flat face of the stake 12 such that unintended rotary movement of the grill 14 will be thwarted.

In a specific embodiment, binding ring 16 and offset piece 56 and stake 12 and sections of conventional pipe of conventional diameters which allow the offset piece 56 to be coaxially positioned on the stake 12. For example, stake 12 could be a 1 inch diameter pipe and the offset piece 56 and binding ring 16 could be 1½ inch pipe. Further, the offset piece 56 and binding ring 16 can be a single length of pipe with a portion of the wall removed to allow offset piece 56 and binding ring 16 to be rotated out of its coaxial position into the position in which the opposite edges of the binding ring 16 are frictionally secured to stake 12 as above described. In this embodiment, binding ring 16 and offset piece 56 are integral and formed of a single piece of pipe.

In a specific embodiment, the offset piece 56 and binding ring 16 are secured to the grill 14 such that the longitudinal axis of the offset piece 56 and the axis of the binding ring 16 are not perpendicular to the plane defined by the grill 14. Instead, the axis of the offset piece 56 and binding ring 16 define an angle with the plane of the grill 14 such that when the grill is frictionally secured to the stake 12 and the stake 12 is vertically positioned, the grill 14 will be generally horizontal.

In all embodiments, the size and shape of stake 12 and binding ring 16 are chosen such that when the binding ring 16 is coaxially positioned on stake 12, grill 14 may be moved longitudinally of stake 12 and with binding ring 16 frictionally engaged to stake 12 to scour corrosion from stake 12. By having the ability to scour the stake 12 when needed, the stake 12 and the grill 14 can always be mounted as above described and fully useful even when stake 12 is permanently mounted outdoors and the grill 14 is left mounted on the stake in all kinds of inclement weather.

Using a binding ring 16 for mounting the grill 14 or any accessory to the stake 12 requires putting the binding ring 16 on or taking it off longitudinally at the top 26 of the stake 12, such that the binding ring 16 must be slid down from the top 26 or to put it on and slid up and out over the top 26 to take it off. Although the binding ring 16 is useful as a means for frictionally attaching the grill or any accessory, an alternative means for frictionally engaging the accessories is desirable in particular when the stake is fixed and the grill is attached and it is desired to position an accessory below the grill. Otherwise, the grill will have to be removed each time an accessory is positioned on the stake. Accessory ring 60 allows for any accessory to be positioned on stake 12 as desired without moving grill 12 or any other accessory already on stake 12.

An accessory ring 60 as shown in FIG. 5 uses a similar mode of binding action as binding ring 16, and can be attached or removed from the stake in a lateral or angular direction instead of a longitudinal or coaxial direction. In a specific embodiment, the accessory ring 60 is a rigid piece configured such as a partial coil wound around a uniform tube. The accessory ring is not 360 degrees around from a top-down perspective, but rather is akin to a rigid piece that wraps from the top left (or top right) down and around to the bottom left (or bottom right), leaving one side 62 substantially open for receiving the stake 12. In other specific embodiments, the accessory ring 60 is a partial spiral piece cut from a tube or pipe, leaving one side 62 open for receiving the stake 12.

The accessory ring 60 has an inner diameter 64 and a length to diameter ratio which is about the same or similar to the binding ring 16 such that it may move freely longitudinally along the length of the stake 12 when the stake is coaxially disposed within the accessory ring 60. The frictional engagement of the accessory ring 60 is achieved in a way similar to the binding ring 16. When the accessory ring 60 receives the stake 12, the stake 12 is coaxially disposed within the accessory ring 60 such that the accessory ring 60 may be adjustable longitudinally and rotationally about the stake 12. When the accessory ring 60 is angularly displaced by the angular downward force caused by the laterally outward center of gravity of the accessory to which the accessory ring 60 is attached or spring 128 or both, the accessory ring 60 is bound to the stake 12 and the accessory is mounted in place as a result of the friction between the accessory ring 60 and the stake 12. In a specific embodiment, the upper portion 66 of the accessory ring 60 binds to the stake on the side of the stake 12 opposite the outward cantilevered extension of the accessory from the stake, and the lower portion 68 of the accessory ring rests against the side of the stake.

In a specific embodiment, accessory ring 60 may be formed of a length of pipe of the appropriate diameter to give the ring 60 a length to diameter ratio of less than about 1.1 or less such that ring 60 may be positioned on stake 12 and to be frictionally secured to stake 12 as above described with regard to binding ring 16. However, accessory ring 60 has a portion 62 of the wall removed. This portion 62 would extend end to end and be generally rectangular in shape having opposite, spaced apart, generally parallel side walls 65. The portion 62 removed, of course, could either extend longitudinally of the accessory ring 60 generally parallel to the axis thereof, or be angularly disposed as shown in FIG. 5. In all embodiments of accessory ring 60, the distance between opposite sides 65 of the removed portion 62 must be greater than the diameter of stake 12 such that stake 12 may be positioned within the ring 60 by moving stake 12 through the removed wall portion 62. When the longitudinal axis of the wall portion 62 removed is generally parallel to the axis of the longitudinal axis of ring 60, the helical ring must be secured to the accessory in a manner such that the cantilevered position rotatably removed from the coaxial position of the ring and stake is rotationally removed from the removed wall portion 12. In this way, the frictional binding of the accessory to the stake 12 is ensured.

In still another embodiment of the helical ring 60, the wall portion 62 removed is angularly disposed with the longitudinal axis of the helical ring 60. The wall portion 62 removed thus follows the curvature of the ring, and is generally helical in shape. By making the longitudinal axis of the wall portion removed angular with the longitudinal axis of the ring 60, there is less need to ensure that the wall portion 62 removed is rotatably spaced from the engagement between the helical ring 60 and the stake 12 when an accessory is frictionally engaged with the stake 12 because of the unlikelihood that the accessory would be unintentionally positioned to align both the removed wall portion 62 of the ring 60 with the stake 12.

Helical ring 60 is shown in FIG. 5 to include a tubular body 111 having opposite ends 114 and 116 and a portion 62 of the wall removed extending from end 114 to 116. The removed portion 62 has spaced apart, generally parallel, opposite side walls 65 and a longitudinal axis 124. When the axis 124 is angularly disposed to the longitudinal axis 126 of the helical ring 60, the removed portion 62 is shaped as a helix extending from end 114 to 116. The spacing between the opposite side walls 65 is greater than the diameter of stake 12 such that stake 12 can be positioned within the helical ring 60 by passing the same through the removed wall portion 62 and positioned end to end, coaxially within the helical ring 60. In a specific embodiment, helical ring 60 may be a section of a pipe with a wall portion 62 removed as above described with the spring 128 spot welded at 129 adjacent end 116.

Alternatively to utilizing the spring 128 in rings 16, 60, to ensure that in all conditions, the rings 16, 60 in their at rest position are angular to the stake 12 on which they are positioned and not coaxial, the rings 16, 60 may be wedged in that position, if desired. A wedge 130 is shown in FIG. 6 to include a collar 132 with an opening 134 therein. Adjacent opening 134 is a depending tapered wedge 136. The exterior diameter of the collar is larger than rings 16, 60. The opening 132 is sufficiently large to allow stake 12 to be positioned therein. Wedge 136 is positioned adjacent the opening 134, generally parallel to axis 118, and arcuately shaped so to be positioned between the stake 12 and rings 16, 60 when installed on stake 12 to wedge the binding ring 16, 60 into their rotated, non-coaxial positions in which the opposite edges of the binding ring are frictionally secured to the stake 12 as above described.

Multiple wedges 130 are provided. A wedge 130 is used with each grill or accessory, and positioned on stake 12 after each grill or accessory is positioned on stake 12 as desired. Wedge 136 is positioned between the rings 16, 60 and the stake 12 and the wedge is hammered into position by hammering on the collar 132 downwardly toward end 28. The wedge 130 may be removed and slid off the stake 12 by hammering on the wedge upwardly toward end 26. In the case of grill 14, a wedge 130 can be utilized to position the wedge 136 between the stake 12 and the vertical offset piece 56 to maintain the ring 16 of the grill 14 in its non-coaxial rotated position.

Alternatively to utilizing the spring 128 or the wedges 130 and the rings 16, 60, there is provided a longitudinally extending slot 200 in the rings 16, 60. In slot 200 there is journaled in the wall of the rings 16, 60 a disc-shaped element 200 that in one position is flush with the interior wall of the rings 16, 60 and when rotated in the direction of arrow 204, extends into the central bore of the rings 16, 60 acting as a wedge to wedge the rings 16, 60 to the shaft stake 12. In order to rotate the disc-shaped element, a handle 202 is secured thereto. See FIG. 7.

Accessories may be attached to the stake to enhance the cooking experience and use of the present invention. One such accessory is a suspension hook 69. In a specific embodiment, the suspension hook 69 is a piece having opposite ends 72, 72. One end 72 of the piece is secured to a accessory ring 60. See FIG. 1. End 72 may alternatively be secured to a binding ring 16. The other end 74 of the piece has an upwardly facing hook 78 connected thereto. In specific embodiments, the piece between its ends may be shaped to form a downwardly facing semicircular portion having a radius of between 3 inches and 10 inches. In yet other specific embodiments, piece may be shaped otherwise as desired and the end 72 of the piece secured to the accessory ring 60 may have a tangential stem extension 80 disposed between end 72 and the ring 60. See FIG. 3. In yet other specific embodiments, the upwardly facing hook 78 is an upwardly facing curved piece 70 having a radius of between ¼ inch and 2 inches.

In a specific embodiment, the suspension hook 69 is constructed of a rigid material such as a ½ inch diameter iron or steel bar. When mounted to the stake 12, the suspension hook 69 is useful for suspending a cooking pot or other similar cooking receptacle having a pivotal handlebar connected to the outer rim thereof over the fire by placing the handlebar in the upwardly facing hook 78 which is configured to receive such a pot handle.

Another accessory useful in the practice of the present invention is a second grill 86 which is of the same or similar construction as the grill 12, having a peripheral frame 88 and a grilling grate 90 disposed therein. In a specific embodiment, the second grill 86 has an accessory ring 60 secured to the peripheral frame 88 of the second grill 86. A binding ring 16 may alternatively be connected to the second grill 86. In other specific embodiments, more than one accessory ring 60 may be secured to different locations on the peripheral frame of the second grill 86. In yet other specific embodiments, the second grill is rectangular in configuration and has an accessory ring 60 secured to one of the short sides of the peripheral frame 88 and to one of the long sides of the peripheral frame 88. In yet other specific embodiments, the second grill 86 has a smaller peripheral dimension than the grill 14.

The second grill 86 may be used for additional grilling space at a different height than the grill 14. If mounted to the stake high enough away from the open fire, the second grill 86 also may be used as a warmer. The second grill may also be used as a warmer at lower heights on the stake when the second grill 86 is pivoted away from the fire so that it is no longer directly above the fire but near enough the fire so that it continues to receive its heat. In a specific embodiment, the second grill 86 is configured to receive or support a rigid platform 94. In other specific embodiments, the rigid platform 94 is a cutting board. In yet other specific embodiments, the rigid platform 94 may be used as a tray for retaining cooking utensils or as a surface for preparing food to be grilled.

Another accessory useful in the practice of the present invention is a rotisserie 96. The rotisserie accessory can be any conventional rotisserie journaled in a bearing 104 adapted to be secured to a helical ring 60 for mounting onto the stake 12. A binding ring 16 may alternatively be used for mounting the rotisserie 96. In a specific embodiment, the rotisserie 96 comprises a long central skewer 98 having a handle 100 connected to one end for rotating the skewer. In other specific embodiments, the central skewer 98 has a secondary skewer 106 connected thereto near the handle 100 and extending generally parallel of the central skewer 98. In yet other specific embodiments, the handle 100 is a contiguous extension of the central skewer 98. The central skewer is pointed at one end for receiving food items to be cooked over the open fire and the other end has a 90 degree bend 108 followed by a second 90 degree bend 110 in the direction opposite the pointed end of the central skewer 98 in order to form the handle 100. The secondary skewer 106 is a skewer piece secured to the central skewer 98 that initially extends outwardly generally perpendicular to the central skewer 98 and then bends in the direction of the pointed end of the central skewer 98, generally parallel to the central skewer 98. The secondary skewer 106 also has a pointed end for receiving food items to be cooked over the open fire.

In a specific embodiment, a portion of the central skewer 98 between the connection of the secondary skewer 106 and the handle 100 is disposed within a hollow bearing 104. Bearing 104 has an inner dimension adapted to receive the central skewer to support the central skewer and sized to journal the central skewer within the bearing 104 and to allow the central skewer to rotate freely within the bearing. A helical ring 16, 60 is secured to the outer surface of the bearing 104 for mounting the rotisserie 96 to the stake 12.

In all of the accessories described herein, the rotisserie 96 and the suspension hook 69 are particularly capable of unintentionally sliding down the stake 12, either loaded or unloaded as only the center of gravity of the accessory being laterally outwardly from the rings 16, 60 and the stake 12, both the accessories in angular displacement with respect to the stake 12. Neither the suspension hook 69 or the rotisserie 96 in unloaded condition have sufficient weight to ensure that the binding ring 16, 60 will always be in its rotated, angular, non-coaxial position in all occasions. Thus, rings 16, 60 on both of these accessories, for safety sake, should be either provided with a spring 128 or utilized with a wedge 130. This is especially true of the rotisserie 96 when lightly loaded as the cranking of the handle of the rotisserie may apply forces to the rotisserie 96 opposing the force of the weight of the loaded rotisserie 96 sufficient to cause the ring 16, 60 to be rotated into a coaxial position with regard to stake 12 which would allow the rotisserie 96 to unintentionally slide downwardly of the stake 12 out of its desired position without the provision of spring 128 or the use of a wedge 130.

The stake 12, the grill 14, and the accessories are all constructed of rigid materials. In a specific embodiment, the stake 12 is a 1 inch structural pipe having an outer diameter of 1.3 inches and an inner diameter of 1 inch. Pipes of different sizes may also be used, as well as configurations other than a pipe. The binding ring 16 and the helical ring 60 in other specific embodiments may be cut out of 1¼ inch structural pipe having an outer diameter of 1.6 inches and an inner diameter of 1.4 inches and a length of about 1.4 inches. The suspension hook 69 and the skewers 98, 106 for the rotisserie 96 may be formed from ½ inch steel rod or iron bar. The grill 14 and the second grill 38, 86 in a specific embodiment may be constructed with 1 inch angle iron configured to form the peripheral frame 88 and an iron grate 48, 90 to serve as the grilling surface.

The rigid materials are subject to wear and corrosion from the elements of the weather and from use. However, the tolerances of the interconnecting pieces, that is, the stake 12, the frictional engagement means 16, 60 used to mount the grill 14 and the accessories to the stake 12, are such that the interconnectability of the pieces is unaffected by wear and corrosion. In a specific embodiment, the frictional engagement means 16, 60 has enhanced binding action when the interconnecting pieces show signs of wear or corrosion, and repeated sliding of the engagement means 16, 60 longitudinally of the stake 12 scours both the stake 12 and the engagement means 16, 60 sufficiently to keep both operational.

Means sufficient for permanently affixing rigid pieces together should be used in the present invention when one rigid piece is secured or connected to another rigid piece of the present invention. In a specific embodiment, spot welding may be used. For example, the peripheral frame of the grill is assembled by spot welding the ends of adjacent frame members, and the iron grate is secured to the frame with spot welds intermittently placed along the peripheral frame. Also, the binding ring 16 and the helical rings 60 are secured to the grill 14 and/or the accessories using spot welds on either side of the ring at its contact point with the grill 14 or the accessory.

In operation, the grill assembly 10 of the present invention is used for cooking purposes over an open fire at a campsite. The stake 12 is inserted into the ground by driving it with a hammer or other similar tool at the top of the stake. The grill 14 with a binding ring 16 secured thereto is cantilever mounted on the stake 12 by inserting the top of the stake through the binding ring 16. The user then determines the height of the grill by maintaining the coaxial alignment of the binding ring 16 and the stake 12 and manually lowering or raising the grill 14 to the desired height using the grill handle 16 to manually support the grill 14. Once the height is selected, the user releases the grill handle 46 to cause the angular displacement between the binding ring 16 and the stake 12 causing the ring to frictionally grip the stake 12 and mount the grill 14 in the desired position. If the user additionally desired to mount accessories on the stake 12, and the accessories have binding rings 16 instead of helical rings 60 for mounting to the stake, a similar process may be used.

If helical rings 60 are secured to the accessories, the rings may receive the stake 12 laterally (although longitudinal insertion may also be performed if desired), and may be positioned using a technique similar to that used to position the grill 14. Helical rings 60 used in connection with accessories may be preferred so that the user can chose to reposition the grill or the accessories in relation to each other along the stake by removing the accessories one at a time instead of having to remove each attached piece and replacing them on the stake in the particular order desired. For example with the helical rings 60 on the attachments, the user can adjust the position of each of the attachments during use of the grill over an open fire without first removing the grill 14 from the stake 12.

The present invention provides a new and improved grill assembly. The new and improved grill assembly is useful for open fire cooking at campsites. The new and improved grill assembly is also adjustable in height and rotatable in relation to the fire. Moreover, the new and improved grill assembly can withstand the weather and elements and is not disabled as a result or corrosion. The new and improved grill assembly additionally has all the amenities of gas grills and charcoal grills. The new and improved grill assembly does not require various mechanisms for assembly and mounting of the grill. The new and improved grill assembly may be used in cooking over an open fire at a campsite irrespective of the type of soil surrounding the campsite. The new and improved grill assembly is relatively portable and can be transported by campers from campsite to campsite by campers. Finally, the new and improved grill assembly includes all of the above-identified features.

While the specific embodiment of the invention has been shown and described herein for purposes of illustration, the protection offered by any patent which may issue upon this application is not strictly limited to the disclosed embodiment; but rather extends to all structures and arrangements which fall fairly within the scope of the claims which are appended hereto:

What is claimed is:

1. A grill assembly for cooking over an open fire, comprising: a stake having a top and a bottom, said bottom being configured to be removably inserted into the ground, and a grill, said grill being removably cantilevered outwardly from said stake by a binding ring secured to said grill, said binding ring surrounding said stake when said grill is assembled on said stake, said binding ring being generally coaxially disposed about said stake when said grill is adjustable longitudinally of said stake at any height above an open fire, said binding ring being frictionally secured by rotation of said binding ring out of said coaxial position about axes transverse to said stake into an angular position, said binding ring having opposite top and bottom edges which are held in engagement with said stake by the weight of said grill, said grill being rotatable about said stake for positioning said grill alternatively over or away from an open fire, a grill accessory being removably cantilevered outwardly from said stake by an accessory ring secured to said accessory, said accessory ring having opposite end openings and a wall opening having spaced apart and generally parallel helical boundaries extending between the opposite ends of said accessory ring, said accessory ring being disposed about said stake by either passing said stake through the opposite end openings of said ring or said wall opening of said ring, said accessory ring being adjustable longitudinally along said stake for mounting said accessory to said stake at any height above an open fire, and adjustable radially for rotating said accessory about the longitudinal axis of said stake for positioning said accessory alternatively over or away from an open fire, wherein said accessory is a second grill removably cantilevered outwardly from said stake by said accessory ring, said second grill being securable to said stake above and below said grill along the longitudinal length of said stake without removing said grill, said second grill having a flat upwardly facing surface, wherein said second grill maybe used as an additional grilling location, a warmer, or a support for a cutting board.

2. The outdoor grill assembly of claim 1 further comprising a rotisserie, said rotisserie being removably cantilevered outwardly from said stake, said helical ring being securable to said stake above and below said grill along the longitudinal length of said stake without removing said grill, said rotisserie having one or more skewers for receiving food items for slow roasting over an open fire and a handle connected to at least one of said skewers for rotating said skewers.

3. The outdoor grill assembly of claim 1 wherein said binding ring is secured to said grill by an offset piece having first and second ends, said first end being secured to said binding ring, said second end being secured to said grill, said piece depending from one edge of said grill thereby positioning said binding ring at a lower elevation than said grill, the length of said offset between said binding ring and said grill being sufficient to raise the center of gravity of said grill in relation to said binding ring in order to enhance the frictional securance between said binding ring and said grill.

4. The grill assembly of claim 1 wherein said accessory ring has a wall opening extending from end to end, said wall opening having spaced apart opposite opening sides which are generally parallel to each other, said sides being angularly disposed to the longitudinal axis of said ring whereby said wall opening forms a helix extending from end to end.

5. The outdoor grill assembly of claim 1 further comprising a plurality of support fins secured to said stake, said fins extending generally radially from said stake, said fins providing enhanced vertical stability to said stake when inserted into the ground.

6. The outdoor grill assembly of claim 5 further comprising a plurality of support fins secured to said stake extending perpendicularly from the surface of said stake, said fins providing enhanced vertical stability to said stake when inserted into the ground.

7. An outdoor grill assembly for cooking over an open fire, comprising: a stake having a top and a bottom, said bottom being configured to be removably inserted into the ground, and a grill, said grill being removably cantilevered outwardly from said stake by a binding ring secured to said grill, said binding ring surrounding said stake when said grill is assembled on said stake, said binding ring being secured to said grill by an offset piece having first and second ends, said first end being secured to said binding ring, said second end being secured to said grill, said vertical offset piece depending from one edge of said grill, said binding ring being at a lower elevation than said grill, the length of said vertical offset piece between said binding ring and said grill being sufficient to raise the center of gravity of said grill over said binding ring in order to enhance the frictional securance between said binding ring and said stake, said binding ring being generally coaxially disposed about said stake when said grill is adjustable longitudinally of said stake at any height above an open fire, said binding ring being frictionally secured by rotation of said binding ring out of said coaxial position about axes transverse to said stake into an angular position, said binding ring having opposite top and bottom edges which are held in engagement with said stake by the weight of said grill in said angular position, said grill being rotatable about said stake for positioning said grill alternatively over or away from an open fire.

8. The outdoor grill assembly of claim 7, wherein said stake and ring both have cross-sections chosen from the group of cross-sections consisting of circular, square, triangular, hexagonal, pentagonal and other multi-faceted cross-sections.

9. The outdoor grill assembly of claim 7, wherein the length of said offset piece is between 1 inch and 10 inches.

10. The outdoor grill assembly of claim 7, wherein said stake and offset piece are sections of conventional pipe of diameters which allow said offset to be coaxially positioned on said stake, said offset piece having a portion thereof adjacent said second end removed to allow said stake to be partially positioned in said removed portion thereby to increase the angle between the axes of said binding ring and said stake and the frictional securance therebetween.

11. The outdoor grill assembly of claim 10 wherein said binding ring and said offset piece are integral.

12. The outdoor grill assembly of claim 7, wherein said binding ring and stake are chosen in size such that movement of said binding ring longitudinally of said stake will scour corrosion from both said binding ring and stake.

13. The outdoor grill assembly of claim 7, wherein said grill comprises a peripheral frame and a grate disposed within said frame, and wherein said grill is further supported by a plurality of cantilever supports extending between said binding ring and said frame.

14. The outdoor grill assembly of claim 13 wherein said second grill has less surface area than said grill.

15. The outdoor grill assembly of claim 13 wherein said second grill has a rectangular configuration comprising a peripheral frame and a grate disposed within said frame, said helical ring being secured to a short side of said frame, and another helical ring being secured to a long side of said frame.

16. The outdoor grill assembly of claim 7, further comprising: a plurality of support fins secured to said stake, said fins extending generally radially from said stake, said fins providing enhanced vertical stability to said stake when inserted into the ground.

17. The outdoor grill assembly of claim 7, further comprising a grill accessory being removably cantilevered outwardly from said stake by an accessory ring secured to said accessory, said accessory ring having opposite end openings and a wall opening having spaced apart and generally parallel helical boundaries extending between the opposite ends of said accessory ring, said accessory ring being disposed about said stake by either passing said stake through the opposite end openings of said ring or said wall opening of said ring, said accessory ring being adjustable longitudinally along said stake for mounting said accessory to said stake at any height above an open fire, and adjustable radially for rotating said accessory about the longitudinal axis of said stake for positioning said accessory alternatively over or away from an open fire.

18. The outdoor grill assembly of claim 17 wherein said accessory is securable to said stake above and below said grill along the longitudinal length of said stake without removing said grill.

19. The outdoor grill assembly of claim 17 wherein said accessory is a hook, said hook being securable to said stake above and below said grill along the longitudinal length of said stake without removing said grill.

20. The outdoor grill assembly of claim 17 wherein said accessory is a second grill removably cantilevered outwardly from said stake by said accessory ring, said second grill being securable to said stake above and below said grill along the longitudinal length of said stake without removing said grill, said second grill having a flat upwardly facing surface, wherein said second grill maybe used as an additional grilling location, a warmer, and a support for a cutting board.

21. The outdoor grill assembly of claim 17 wherein said accessory is a rotisserie, said rotisserie being removably cantilevered outwardly from said stake, said helical ring being securable to said stake above and below said grill along the longitudinal length of said stake without removing said grill, said rotisserie having one or more skewers for receiving food items for slow roasting over an open fire and a handle connected to at least one of said skewers for rotating said skewers.

22. The outdoor grill assembly of claim 7, wherein said stake, said grill, and said binding ring are manufactured of a rigid material, and selected from the group comprising steel and iron.

23. The outdoor grill assembly of claim 22 wherein said stake is manufactured of structural pipe, said grill is manufactured of structural angle pieces interconnected to form a peripheral frame having a structural grate disposed within said peripheral frame, and said binding ring is manufactured of structural pipe having an inner diameter greater than the outer diameter of said stake.

24. An outdoor grill assembly for cooking over an open fire, comprising: a stake having a top and a bottom, said bottom being configured to be removably inserted into the ground, and a grill, said grill being removably cantilevered outwardly from said stake by a binding ring secured to said grill, said binding ring surrounding said stake when said grill is assembled on said stake, said binding ring being generally coaxially disposed about said stake when said grill is adjustable longitudinally of said stake at any height above an open fire, said binding ring being frictionally secured by rotation of said binding ring out of said coaxial position about axes transverse to said stake into an angular position, said binding ring having opposite top and bottom edges which are held in engagement with said stake by the weight of said grill in said angular position, said grill being rotatable about said stake for positioning said grill alternatively over or away from an open fire, said binding ring and stake being chosen in size such that movement of said binding ring longitudinally of said stake will scour corrosion from both said binding ring and stake.

25. The outdoor grill assembly of claim 24 wherein said stake and ring both have cross-sections chosen from the group of cross-sections consisting of circular, square, triangular, hexagonal, pentagonal, and other multi-faceted cross-sections.

26. The outdoor grill assembly of claim 24 further comprising a grill assembly being removably cantilevered outwardly from stake by an accessory ring secured to said accessory, said accessory ring having opposite end openings and a wall opening having spaced apart and generally parallel helical boundaries extending between the opposite ends of said accessory ring, said accessory ring being disposed about said stake by either passing said stake through the opposite end openings of said ring or said wall opening of said ring, said accessory ring being adjustable longitudinally along said stake for mounting said accessory to said stake at any height above an open fire, and adjustably rotatably about the longitudinal axis of said stake for positioning said accessory alternatively over and away from an open fire.

27. An outdoor grill assembly for cooking over an open fire, comprising: a stake having a top and a bottom, said bottom being configured to be removably inserted into the ground, and a grill, said grill being removably cantilevered outwardly from said stake by a binding ring secured to said grill, said binding ring surrounding said stake when said grill is assembled on said stake, said binding ring being generally coaxially disposed about said stake when said grill is adjustable longitudinally of said stake at any height above an open fire, said binding ring being frictionally secured by rotation of said binding ring out of said coaxial position about axes transverse to said stake into an angular position, said binding ring having opposite top and bottom edges which are held in engagement with said stake by the weight of said grill in said angular position, said grill being rotatable about said stake for positioning said grill alternatively over or away from an open fire, a grill accessory being removably cantilevered outwardly from said stake by an accessory ring secured to said accessory, said accessory ring having opposite end openings and a wall opening having spaced apart and generally parallel helical boundaries extending between the opposite ends of said accessory ring, said accessory ring being disposed about said stake by either passing said stake through the opposite end openings of said ring or said wall opening of said ring, said accessory ring being adjustable longitudinally along said stake for mounting said accessory to said stake at any height above an open fire, said grill accessory being adjustable rotatably about the longitudinal axis of said stake for positioning said accessory alternatively over or away from an open fire.

28. The outdoor grill assembly of claim 27 wherein said accessory is securable to said stake above and below said grill along the longitudinal length of said stake without removing said grill.

29. The outdoor grill assembly of claim 27 wherein said stake and ring both have cross-sections chosen from the group of cross-sections consisting of circular, square, triangular, hexagonal, pentagonal, and other multi-faceted cross-sections.

30. The outdoor grill assembly of claim 27 wherein said binding ring and stake are chosen in size such that the movement of said binding ring longitudinally of said stake will scour corrosion from both said binding ring and stake.

* * * * *